United States Patent [19]

Suzuki et al.

[11] 3,852,401

[45] Dec. 3, 1974

[54] METHOD FOR PRODUCING ARTIFICIAL FIBERS CONTAINING MICROCAPSULES

[75] Inventors: Hiroshi Suzuki; Tadashi Ichimaru, both of Okayama, Japan

[73] Assignee: Japan Exlan Company Limited, Osaka, Japan

[22] Filed: June 27, 1972

[21] Appl. No.: 266,744

[30] Foreign Application Priority Data
June 29, 1971  Japan.............................. 46-47524

[52] U.S. Cl.......... 264/182, 252/316, 260/29.6 AN, 264/184, 264/211
[51] Int. Cl. .............................................. D01f 7/00
[58] Field of Search..... 264/182, 184; 260/29.6 AN, 260/29.6 AB, 29.6 AQ, 823, 875, 876, 878, 34.2; 117/100 A; 252/522, 316

[56] References Cited
UNITED STATES PATENTS

| | | | |
|---|---|---|---|
| 2,780,833 | 2/1957 | Braulich............................ | 264/171 |
| 2,908,659 | 10/1959 | Shashoua........................... | 264/183 |
| 2,955,017 | 10/1960 | Boyer................................. | 264/183 |
| 3,016,308 | 1/1962 | Macauley....................... | 117/100 A |
| 3,051,545 | 8/1962 | Steuber............................. | 264/183 |
| 3,242,120 | 3/1966 | Steuber...................... | 260/29.6 AN |
| 3,410,819 | 11/1968 | Kourty et al................ | 260/29.6 AN |
| 3,516,846 | 6/1970 | Matson .............................. | 252/522 |
| 3,560,423 | 2/1971 | Levesque et al................ | 117/100 A |
| 3,567,119 | 3/1971 | Wilbert et al...................... | 252/522 |
| 3,573,237 | 3/1971 | Zola.................................. | 260/34.2 |
| 3,585,149 | 6/1971 | Vassiliades et al............... | 260/41 R |
| 3,669,899 | 6/1972 | Vassiliades et al............... | 260/41 R |
| 3,714,102 | 1/1973 | Reiss................................. | 252/316 |
| 3,740,356 | 6/1973 | Manoa et al...................... | 252/316 |
| 3,753,922 | 8/1973 | Shimosaka et al................ | 252/316 |
| 3,755,064 | 8/1973 | Maierson .......................... | 161/174 |
| 3,773,884 | 11/1973 | Shimosaka et al................ | 264/182 |

*Primary Examiner*—Jay H. Woo
*Attorney, Agent, or Firm*—Wenderoth, Lind & Ponack

[57] ABSTRACT

Microcapsules containing a fiber modifier are introduced into the fibers by forming the microcapsules directly in the polymer spinning solution and extruding the resultant spinning solution in the usual manner.

14 Claims, No Drawings

METHOD FOR PRODUCING ARTIFICIAL FIBERS CONTAINING MICROCAPSULES

The present invention relates to an improved method of producing artificial fibers having novel properties. More particularly, by enclosing a fiber modifier in fine containers of microscopic order (miscrocapsules) consisting of a film-forming substance and then causing the fiber modifier which has been thus formed into substantially solid spherical particles to be contained in the fibers, artificial fibers having various new properties are produced which have otherwise been hardly possible to realize, such properties including prolonged effects of the fiber modifier or such modifier effects as will be manifested as required. The present invention provides an improved method of preventing aggregation of the microcapsules and eliminating various troubles in the spinning step by performing the above microencapsulation process in the spinning solution.

In general, in producing microcapsules, there have been used procedures of preparing them beforehand in water or in organic solvents, and the thus-obtained microcapsules are used for their respective purposes in an isolated state or as they remain in the prepared solution.

Thus, in introducing microcapsules in artificial fibers, microcapsules prepared in the general preparation procedures as mentioned above may be used. Namely, these are procedures in which microcapsules prepared in the general procedures are added to a spinning solution and the resulting spinning solution is then spun, or a fiber-forming polymer and a solvent therefor are added to water or an organic solvent containing suspended microcapsules to form a spinning solution which is then spun.

However, in introducing a microencapsulated fiber modifier into fibers, the microcapsules present in the spinning solution have to be fine enough to pass through various small spaces such as filter spaces, spinnerette orifices, etc., and when the general microencapsulating procedures as mentioned above are employed, microcapsules form aggregates with each other because of the change of the state of the microcapsule dispersion medium, such as due to separation of the microcapsules, addition of solvent, etc. Also, the microcapsules thus once aggregated are difficult to be finely redispersed in the spinning solution, thus causing various troubles during the spinning step. Further, in obtaining microcapsules containing a fiber modifier, when the generally employed procedures of preparing them in water or in an organic solvent are used, it is extremely difficult to obtain microcapsule particles fine enough to pass through filter openings and spinnerette orifices.

As the result of a study to improve the above-mentioned shortcomings, the inventors have found that, by microencapsulating a fiber modifier in a spinning solution in which a fiber-forming polymer and a solvent for the polymer are present, fiber modifier-enclosing microcapsules which are formed into fine microparticles are advantageously produced which are dispersed without aggregation, and thereby various troubles in the spinning step can be entirely removed. The present invention has been accomplished on the basis of the above findings.

Therefore, the main object of the present invention is to provide an improved method of producing artificial fibers containing microcapsules.

An object of the present invention is to advantageously produce a spinning solution containing microcapsules which have been formed into extremely fine microparticles, without causing aggregation and in a short period of time.

Another object of the present invention, in the production of artificial fibers containing a fiber modifier, is to prevent any aggregation of microcapsules in the spinning solution and thereby to eliminate various troubles caused by clogging in filter-openings or spinnerette orifices, by microencapsulating the fiber modifier in the spinning solution and then spinning the resulting spinning solution into fibers.

Other further objects of the present invention will become apparent from the concrete explanation of the invention in the following.

These object of the present invention can be attained by adding to a spinning solution prepared by dissolving a fiber-forming polymer in a solvent therefor, a fiber modifier which is incompatible with the spinning solution and a film-forming substance which is soluble in the spinning solution or in the fiber modifier so as to finely disperse the modifier and film-forming substance in the spinning solution and then extruding the microcapsules-containing spinning solution obtained by forming a film which is insoluble in the initial spinning solution on the particle surfaces of the fiber modifier to form microcapsules containing the fiber modifier, to form fibers in the usual way.

The fiber modifier-containing microcapsules produced according to the method of this invention are formed into extremely fine spherical, substantially solid particles in the spinning solution comprising a fiber-forming polymer and a solvent therefor, and are present therein without substantial aggregation. Therefore, various troubles brought about in the spinning step such as clogging in filter spaces, spinnerette orifices, etc., are entirely eliminated, and thereby microcapsules-containing fibers can be produced advantageously.

Further, the spinning solution containing fiber modifier-containing capsules obtained according to the method of this invention is produced in shorter steps in comparison with the general procedures having a separate microencapsulating step, and is free from the steps of isolation of microcapsules and addition of solvent which may give rise to aggregation of the microcapsules with each other. Therefore, it is a major advantage of this invention that aggregation of microcapsules in the spinning solution is prevented and thus any troubles in the spinning step as mentioned above are not caused. Furthermore, it is another advantage of this invention that, because of shorter time of producing a spinning solution containing microcapsules, microcapsules which contain a fiber modifier that is poor in chemical, thermal or mechanical stability, can be advantageously introduced into fibers.

Thus, the artificial fibers obtained according to the method of this invention have many useful properties entirely different from conventional fibers since they contain a fiber modifier enclosed in microcapsules.

One of the characteristic properties of the fibers produced according to the method of this invention is that the fibers can advantageously contain a fiber modifier which otherwise may drop out, evaporate or denaturate in the fiber producing and processing steps, and that an industrial means to prolong the effects of the modifier for a long period of time is provided. Especially, by selecting a suitable film-forming substance to cover the fiber modifier, it is possible to make the fiber modifier penetrate slowly through the formed covering layer (utilizing the semi-permeability of the covering layer) to confer the predetermined effects on the fibers gradually.

It is also a characteristic of the fiber obtained according to the method of this invention that the artificial fibers containing a fiber modifier can manifest the function of the modifier as required. Namely, by applying, as required, physical, chemical or biological effects by means of pressure, heat, light, enzyme, water, or other chemicals to artificial fibers containing microencapsulated fiber modifier to break the microcapsules, it is possible to develop as well as to increase predetermined effects of the fiber modifier contained in the microcapsules. Also, chemicals which have been difficult or impossible to use as fiber modifiers because of their toxity can be used as safely as well-known fiber modifiers whose usefulness has been recognized.

Further, it is another characteristic of the fibers produced according to the method of this invention that a fiber modifier, irrespective of its state, whether in a solid or liquid state, can be introduced into the fibers.

Thus, there are so many advantages of microencapsulated fiber modifiers contained in fibers that enumerating all of them is nearly impossible.

Some of the methods of microencapsulating a fiber modifier in the fiber-forming polymer solution (spinning solution) are mentioned in the following:

1. Monomer A is dissolved in the spinning solution. On the other hand Monomer B is dissolved in the fiber modifier to be used which is incompatible with the spinning solution. Interfacial polymerization is carried out on the interface of the spinning solution and the fiber modifier solution.

2. A monomer or a film-forming substance is added to a fiber-forming polymer solution or fiber modifier. From only one direction, from outside or inside the dispersed droplets of the fiber modifier, the monomer or film-forming substance, with a polymerization catalyst, if necessary are supplied to cause polymerization on the surfaces of the dispersed droplets of the modifier under a predetermined condition such that the resulting polymer could surround the surfaces of the modified particles. This is microencapsulation by in situ polymerization.

3. A film-forming substance dissolved in the spinning solution is separated to form capsule walls onto the surfaces of the modifier droplets in a suitable way. This is microencapsulation by phase separation.

4. A solution of film-forming substances containing a modifier is dispersed in the form of droplets in the spinning solution. The solvent of the film-forming substance is evaporated to form capsule film. This is microencapsulation by drying in liquid.

5. An organic solvent solution of a film-forming substance containing a modifier is added to a spinning solution (the film-forming substance is insoluble in the solvent of the spinning solution), and the film-forming substance is phase-separated at a concentrated polymer phase to form capsule walls which surround the modifier. This is microencapsulation by phase separation from an organic solution system.

More concrete examples of these methods are described in the various patents and references cited in "Industrial Technical Library, Vol. 25, Microcapsules" by Asazi Kondo, Nikkan Kogyo Shimbun Edition, pages 37–57 and pages 67–112.

Among these various microencapsulating methods, methods of providing the microcapsules according to the present invention advantageously are suitably selected depending on the kind of covering materials (i.e., film-forming substances) which is properly determined according to the kind of fiber modifiers or the methods of producing the fibers. In any of these methods, it is especially necessary to disperse the fiber modifier as fine as possible (preferably into particles of 30 $\mu$ or smaller) in the continuous phase, and also to determined the amount of the substance which forms the covering layer as small as possible, in order to obtain extremely fine microcapsules of this invention.

By such microencapsulating methods, microcapsules of 0.5 to 30 $\mu$ in size containing a fiber modifier as an enclosed substance are prepared in this invention. By microencapsulating a fiber modifier into substantially solid particles of 0.5 to 30 $\mu$ in size, and then introducing the fiber modifier-containing microcapsules in the fiber in an amount of less than 40 percent (as the weight of the modifier), the above-mentioned objects of this invention are advantageously achieved.

The lowest limit of the amount of the microencapsulated fiber modifier to be introduced into the fibers varies depending on the desired fiber modifying effects or the kind of modifiers, and it is difficult to specify the lowest limit on a simple basis. In general, however, microcapsules containing a fiber modifier in an amount in excess of 0.1 percent by weight, preferably 0.5 percent by weight, based on the fibers are introduced.

In producing too small microcapsules below 0.5 $\mu$ in size, aggregation may take place and therefore it becomes difficult to introduce them in the fibers; even if the introduction is successful, it is difficult to advantageously maintain or develop the functions of the fiber modifier. Also, in producing microcapsules exceeding 30 $\mu$ in size, it is extremely difficult to introduce them into the fibers and to attain the objects and effects of this invention fully.

In this invention, by limiting the size of the microcapsules containing a fiber modifier to from 1 to 10 $\mu$, the objects and effects of this invention can be attained more effectively.

For the substances to cover fiber modifiers, film-forming substances are used which are incompatible with the modifier and which will become insoluble in the fiber-forming polymer solution (spinning solution).

Among such particular film-forming substances, there can be mentioned polymers such as gelatine, gum arabic, ethyl cellulose, carboxymethyl cellulose, polyvinyl alcohol, epoxy resins, polyester resins, polyamide resins, polyimide resins, melamine resins, urea resins, polybutadiene, polyisoprene, polyacrylamide, polyacrylic acid, polymethacrylic acid, polyurethanes, styrene/butadiene copolymers, acrylonitrile/butadiene copolymers, polychloroprene, polyoxyethylene glycol, etc.; styrene and its derivatives, e.g. α-methylstyrene, o-chlorostyrene, 2,5-dichlorostyrene, pentane chlorostyrene, etc.; acrylic acid and its derivatives, e.g., methyl acrylate, ethyl acrylate, acrylamide, etc.; methacrylic acid and its derivatives, e.g., methyl methacrylate, glycidyl methacrylate, etc.; α-alkyl substituted acrylic acid and its derivatives, e.g., methyl α-ethylacrylate, α-ethyl acryamide, etc.; vinyl esters of saturated aliphatic monovalent carboxylic acids, e.g., vinyl acetate, vinylpropionate, etc.; vinyl halide and vinylidene halide, e.g., vinyl chloride, vinyl bromide, vinylidene chloride, vinylidene bromide, etc.; divinyl compounds, e.g., divinyl benzene, acrylic anhydride, etc.; diallyl compounds, e.g., diallylphthalate, diallylsulfide, etc. Any of other film-forming substances besides these can be used. Among these, film-forming substances are properly selected according to the kind of fiber modifiers to be used and polymers constituting the artificial fibers into which microcapsules are to be introduced. The amount of such film-forming substance may vary over a wide range depending on the particular method of encapsulation, particular amount of the modifier, etc. but generally it is in an amount of 2 – 200 percent by weight based on the modifier.

Thus, the microcapsules used in this invention which contain a fiber modifier have any of such film-forming substances as a covering or coating material. The thickness of the covering or coating layer is especially desirable to be from 0.01 to 0.5 μ. It is also possible to use a double or triple covering layer as required.

In this invention, in producing microcapsules containing a fiber modifier in a fiber-forming polymer solution, it is desirable that the polymer concentration in the solution be within the range of 0.5 to 40 percent, more preferably 5 – 35 percent by weight. In a polymer concentration of less than 0.5 percent, the diameter of the microcapsule particles becomes larger and aggregation of the microcapsules tends to occur. Thus, it then becomes extremely difficult to introduce the microcapsules into the fibers. Also, when the polymer concentration is in excess of 40 percent, the diameter of the microcapsule particles exceeds 30 μ, and thus it is very difficult to introduce such microcapsules into the fibers.

The thus-obtained fiber-forming polymer solution containing a fiber modifier is spun in the well-known spinning method to obtain fibers containing microcapsules which hold the fiber modifier enclosed inside. Particularly advantageous spinning methods are the wet spinning process in which the polymer solution is extruded into a coagulation medium in liquid form (the solvent of the polymer is soluble in the coagulation medium but the polymer is insoluble therein), and the dry spinning process in which the polymer solution in a volatile solvent is extruded in a coagulation medium in gas form (in which the solvent is evaporated).

In this invention, the spinning solution in which a fiber modifier is microencapsulated, in other words the solution of a fiber-forming polymer dissolved in a solvent therefor, means, besides a polymer solution prepared by dissolving a synthetic polymer obtained by the ordinary suspension polymerization or emulsion polymerization or a natural polymer in a solvent therefor, a polymer solution prepared by conventional well-known solution polymerization as well.

Many well-known fiber-forming polymers in general can be used as the artificial fiber-forming polymers of this invention. Among these polymeric substances can be mentioned: synthetic polymers such as polyamides, for example nylon-6; polyesters, for example poly(ethylene terephthalate); vinyl polymers, for example polyvinyl chloride, polyvinyl alcohol; acrylic polymers, for example polyacrylonitrile, copolymers of acrylonitrile with one or more of other vinyl monomers; polymers such as cellulose acetate, etc.

Suitable solvents for these polymeric substances used in the wet spinning process and/or the dry spinning process are well known.

The present invention involves an advantageous method of mixing a microencapsulated fiber modifier in shaped products of such polymeric substances, and the method is particularly effective in applying the wet spinning process of formed products in filamentous form of acrylic polymers which uses a concentrated aqueous solution of an inorganic salt as the solvent for the polymer.

In order to simplify the following explanation, the invention is described according to the wet spinning of acrylic polymer filaments, with the proviso that the present invention is not limited to specified procedures described hereinafter.

Many kinds of spinning solutions which contain acrylic polymer dissolved in a suitable solvent are well known and are useful for this invention. Representatives of such polymers and solvents are disclosed in the specification of U.S. Pat. No. 2,948,581 of Cumming, issued Aug. 9, 1960 and in many other U.S. patents cited therein.

Representative compounds which polymerize with acrylonitrile to produce acrylic products useful in practicing the present invention are compounds that have a

group.

Examples of these compounds are: vinyl esters of saturated aliphatic monovalent carboxylic acids, for example vinyl acetate, vinyl propionate, vinyl butyrate; vinyl halide and vinylidene halide, for example vinyl chloride, vinyl bromide, vinyl fluoride, vinylidene chloride, vinylidene bromide, vinylidene fluoride; allyl type alcohols, for example allyl alcohol, methallyl alcohol, ethallyl alcohol, etc.; allyl, methyl and other unsaturated monovalent alcohol esters of monobasic acid, for example ally and methally acetates, laurates, cyanides; α-alkyl substituted acids (for example methacrylic acid, ethacrylic acid) as well as esters and amides of such acids (for example methyl, ethyl, propyl, butyl, etc., acrylates and methacrylates; acrylamides, methacrylamide, N-methyl, -ethyl, -propyl, -butyl acrylamides and methacrylamides); methacrylonitrile, ethacrylonitrile, and other hydrocarbon substituted acrylonitriles; unsaturated sulfonic acids having a $CH_2=C=$ group and their salts, for example allyl sulfonic acid, styrene sulfonic acid, and their sodium salts, potassium salts; unsaturated aliphatic hydrocarbons having a $CH_2=C=$ group, for example isobutylene; and there are many other vinyl, acrylic compounds and other compounds having a $CH_2=C=$ group and polymerizable with acrylonitrile to produce thermoplastic copolymers. Also allyl esters of α,β-unsaturated polycarboxylic acids, for example dimethyl, ethyl, propyl, or butyl ester of maleic acid, fumaric acid, or citraconic acid, polymerize with acrylonitrile to produce copolymers.

Ordinarily, the molecular weight (average molecular weight) of homopolymer of acrylonitrile or copolymer of acrylonitrile to produce shaped products of polyacrylonitrile ranges from 25,000 or 30,000 to 200,000 or 300,000 or above, and it is particularly advantageous for the molecular weight to be within the range of 50,000 to 100,000. These molecular weights are calculated from observed viscosity values of the polymer in dimethylformamide using the Staudinger formula, etc. Refer to the specification of U.S. Pat. No. 2,404,713, issued July 23, 1946. Preferably the polymer molecule contains at least 80 percent combined acrylonitrile, but polymers containing less than 80 percent of acrylonitrile are also useful for the practice of this invention.

Representative solvents which are able to dissolve acrylonitrile polymer include organic solvents such as dimethylformamide, dimethylacetamide, ethylene carbonate and dimethyl sulfoxide, and inorganic solvents such as concentrated aqueous solution of inorganic salt, for example sodium thiocyanate, zinc chloride, etc.

The fiber modifiers introduced into fibers in this invention are those that can change the fiber properties physically and/or chemically. For example, sanitary processing agents, flame resistant agents, luminous substances, deodorants, softening agents, perfumes, antistatics, antioxidants, U. V. absorbers, etc. Thorough enumeration of concrete examples applicable to this invention is difficult because they extend to too wide a range. Thus, only a part of them are mentioned here, but of course the invention is not limited to these examples. There can be enumerated: perfumes such as anisole acetophenone, acetyl eugenol, anise aldehyde, anethole, isoamyl acetate, isoamyl salicylate, ethyl vaniline, eugenol, ethyl propionate, citronellal, hydroxycitronellal, isoamyl valerate, isobutyl butyrate, ethylisocalerate, etc.; stabilizers such as lead salicylate, Ba-Cd laurate, Sr-Zr laurate, barium stearate, magnesium stearate, dibutyl tin maleate, etc.; pigments such as lead white, zinc flower, ultramarine, Benzidine Orange, Benzidine Yellow, Copper Phthalocyanine Green, Pyrazoline Red, etc.; antistatics such as sodium polyoxymethylene cetyl sulfate, polyoxyethylene octamine, ethylene oxide addition products of alkylphenol, stearic acid monoglyceride, sorbitan distearate, trimethyloctadecylammonium chloride, etc.; softening agents such as octadecylamine acetate, octadecyl ethylene urea, trimethyldodecylammonium chloride, sorbitan monolaurate, etc.; fire retarding chemicals of phosphorus and/or halogen containing compounds such as 1,2,3,4-tetrabromobutane, 1,1,2,2-tetrabromoethane, tetrabromobisphenol A, pentachlorophenol, pentabromophenol, perchloropentacyclodecane, pentabromotoluene, hexabromobenzene, triphenylphosphite, diphenylnonylphosphite, diphenylphosphite, tris(nonylpheny)phosphite, dibutylphosphite, tris($\beta$-chloroethyl)phosphite, tris($\beta$-bromoethyl)phosphite, tris(2,3-dibromopropyl)phosphate, tris(2,3-dichloropropyl)phosphate, tris(2-chloroethyl)phosphate, tris(2-bromoethyl)phosphate, tris(3-chloropropyl)phosphate, chlorine-containing polyphosphonate, chlorine and bromine-containing polyphosphonate, guanidinophosphoric acid, tetrakis(hydroxymethyl)phosphonium chloride, tris(1-aziridinyl)phosphonium oxide, tetrabromophthalic anhydride, tetrachlorophthalic anhydride, chlorinated parafine, tricresylphosphate, trioctylphosphate, trioctyldiphenylphosphate, tris(2-chloropropyl)phosphate, tris(2-chloroethyl)phosphate, tris(2-bromoethyl)phosphate, tris(1,3-bromochloroisopropyl)phosphate, hexachlorobenzene, 2,4,6-trichlorophenol, brominated cyclododecatriene, trichlorobiphenyl, tetrachlorobiphenyl, pentachlorobiphenyl, hexachlorobiphenyl, etc.; antifungal agents such as tributyl tin acetate, dimethyldithiocarbamate zinc, salicylanilide, tetramethylthiuranium disulfide, phenylmercury acetate, bis(trimethyl tin)oxide, etc.; antioxidants such as 3-methyl-4-isopropylmetacresol, 4,6-diisopropylmetacresol, 3,5-di(t-butyl)-4-hydroxytoluene, 2,6-di(t-butyl)paracresol, dilaurylthiodipropionate, etc.; U. V. absorbing agents such as phenylsalicylate, 2-hydroxy-4-methoxybenzophenone, resorcinol monobenzoate, 2,2-dihydroxy-4-methoxybenzophenone,, etc.

These fiber modifiers are microencapsulated in a spinning solution (fiber-forming polymer solution) by a suitable method as mentioned above according to their respective properties and kind of polymer solvents used to be formed into substantially solid spherical particles of 0.5 to 30 $\mu$ in diameter. The spinning solution thus obtained containing microcapsules, directly as such or after being added to a large amount of polymer solution as a master batch, is formed into filaments by any of the well known wet or dry spinning methods described in Japanese Pat. Publication Nos. 3645/50, 4821/53, 9515/57, 878/63 and 2589/61, and U.S. Pat. Nos. 2,404,725 to 2,404,728 and further subjected to the post-treatment including washing with water, stretching, drying, heat treatment, etc., as required, to obtain fibers having new properties.

The following examples are for better explanation of this invention and are not intended to limit the scope of the invention. The percentages and parts in the examples are all by weight unless otherwise indicated.

EXAMPLE 1

To 1,000 parts of a spinning solution consisting of 9 parts of acrylonitrile copolymer polymerized with 12 percent vinyl acetate and 91 parts of 44 percent sodium thiocyanate, 36 parts of tris(1-chloro-3-bromoisopropyl)phosphate as a flame retarding agent, 3.6 parts of melamine-formaldehyde precondensate, as a film-forming substance and 0.36 part of an organic amine salt as the curing catalyst for the resin were added. The mixture was then heated to 80°C. for 0.5 hour while stirring with a stirrer Homomixer (produced by Tokushu Kika Kogyo; SL type), whereby the methylolmelamine resin was cured on the particles of the flame retarding agent and a spinning solution which contains microcapsules containing the flame retarding agent inside was prepared. Microscopical observation of this spinning solution showed uniform diameters of the microcapsules of about 2 $\mu$ and no aggregated particles.

The thus-obtained spinning solution containing microcapsules, after being deaerated, was extruded to be coagulated in a 12 percent aqueous solution of sodium thiocyanate at −2°C. through a spinnerette having eight orifices of 0.2 mm. in diameter. After being washed with water, the resulting filaments were stretched 10 times in a boiling water, followed by wet heat relaxation treatment at 110°C. Thus, acrylic fibers of 50 denier which contains microcapsules having the flame retarding agent inside were prepared. During the spinning operation, no troubles such as filament breakage due to clogging of the spinnerette orifices occurred. After spinning the filter was decomposed, and it was confirmed that no clogging had took place.

In contrast to this, when a separated microencapsulating process was used, various troubles occurred. Thus, 36 parts of the above-mentioned flame retarding agent was mixed with 250 parts of water by the Homomixer at room temperature for 30 minutes to disperse into an emulsion. Then, 3.6 parts of the above-mentioned methylolmelamine resin and 0.36 part of the curing agent of the resin were added. The resulting mixture was then heated to 80°C. with stirring to cure the resin. Thus the fiber modifier was microencapsulated. Thereafter, the temperature of the system was lowered to room temperature. After standing, the supernatant solution was discarded to remove the resin and curing agent which did not participate in encapsulation, from the system. Then, after adding water anew to make up the total amount of water in the system to 100 parts, 90 parts of the above-mentioned acrylonitrile copolymer, 293 parts of water and 417 parts of sodium thiocyanate were added, and the mixture was maintained at 65°C. for 75 minutes. Thus, a spinning solution which contains microcapsules having the above-mentioned fiber modifier inside was prepared. Microscopic observation of the spinning solution thus obtained showed that the microencapsulated flame retarding agent particles were very large and many particles aggregated. When this spinning solution containing microcapsules was spun according to the above method, clogging of the spinnerette orifices took place and thus caused troubles such as filament breakage. Accordingly the spinning did not proceed satisfactorily. Upon decomposing the filter after spinning, an appreciable amount of agglomerated microcapsule mass dogging on the filter was observed. Since the acrylic fibers produced with such troubles thus lost a large amount of the flame retarding agent to be introduced, they were much inferior to the fibers produced according to the method of this invention in flame retardancy.

EXAMPLE 2

To 100 parts of 1 percent aqueous solution of polyvinyl alcohol (Gosenol KH–17 produced by Japan Synthetic Chemical Company, Ltd.), 8.8 parts of a flame retarding agent tris(1-bromo-3-chloroisopropyl)phosphate was added. The resulting mixture was dispersed into an emulsion by means of a stirrer Homomixer (produced by Tokushu Kika K.K; SL type). Then, 0.1 part of borax was added, and stirring was continued to form hardened film of polyvinyl alcohol on the dispersed particles of the flame retarding agent.

Then 22 parts of acrylonitrile copolymer consisting of 88 percent acrylonitrile and 12 percent vinyl acetate and 78 parts of sodium thiocyanate were added and heated at 65°C. for 1.5 hours to obtain a spinning solution containing microencapsulated flame retarding agent. Observation by microscopic photograph, of the spinning solution thus obtained showed that microcapsule particles containing the flame retarding agent inside aggregated with each other, and the aggregates exceeded 50 $\mu$ in size. This spinning solution was tested for spinning into a 12 percent aqueous solution of sodium thiocyanate at −2°C. through a spinnerette having 100 orifices of each 0.09 mm. in diameter. This spinning proved impossible because of excessive breakage of gelled filaments.

On the other hand, according to the method of this invention, 8.8 parts of tris(1-bromo-3-chloroisopropyl)phosphate was added to a spinning solution consisting of 11 parts of acrylonitrile copolymer of 88 percent acrylonitrile and 12 percent vinyl acetate and 89 parts of a 44 percent aqueous solution of sodium thiocyanate, and was dispersed into an emulsion by means of a stirrer Homomixer. Then 0.1 part of borax and one part of polyvinyl alcohol (Gosenol KH–17, produced by Japan Synthetic Chemical Company Ltd.) were added under continued stirring to prepare a spinning solution which contained microcapsules having the above flame retarding agent inside. The thus-obtained spinning solution was extruded into a 12 percent aqueous solution of sodium thiocyanate at −2°C. through a spinnerette having 100 orifices with each orifice diameter of 0.09 mm. The resulting filaments were stretched 10 times in hot water, followed by wet heat relaxation treatment at 120°C. to obtain 3 denier acrylic synthetic fibers. During this spinning operation, no troubles such as filament breakage due to clogging of the spinnerette orifices and filter clogging took place, and thus the fibers were produced advantageously.

EXAMPLE 3

A mixture consisting of 88 parts of a flame retarding agent tris(2,3-dibromopropyl)phosphate, 14.1 parts of styrene, 3.5 parts of divinylbenzene and 0.88 part of azobisisobutyronitrile was added to 1000 parts of a spinning solution composed of 11 parts of acrylonitrile copolymer of 90 percent acrylonitrile and 10 percent methylacrylate and 89 parts of a 44 percent aqueous solution of sodium thiocyanate. The mixture was dispersed into an emusion by means of a stirrer Homomixer under continued stirring at 70°C. for 2 hours. A spinning solution was obtained without aggregation which contained microcapsules of 2 to 5 $\mu$ in particle diameter, having the above flame retarding agent inside, and having a wall material (covering film) of copolymer consisting of a styrene and divinylbenzene. A test was run for spinning of this spinning solution according to the method of Example 1. Fibers were obtained without troubles in the spinning process.

EXAMPLE 4

Into a spinning solution formed of 30 parts of an acrylonitrile polymer containing 90 percent acrylonitrile and 10 percent methyl acrylate and 70 parts of dimethyl formamide which was a solvent for said polymer, there was added 2 percent antimony trioxide on said polymer. The mixture was emulsified and dispersed by using a Homomixer. Then, 50 percent vinylidene chloride on the antimony trioxide was added into the mixture. Further, 2 percent diisopropyl peroxydicarbonate as a polymerization initiator on the vinylidene chloride was added into the mixture. The mixture was polymerized at 40°C. for 3 hours to form a coating layer of a vinylidene chloride polymer on the surface of the fine particle of antimony trioxide so that microcapsules containing the antimony trioxide within and having the vinylidene chloride polymer as a wall material was made in the spinning solution of the acrylonitrile polymer. The maximum particle diameter of the obtained microcapsule was 3 $\mu$. This spinning solution was spun by using an ordinary dry-spinning process. That is to say, the spinning solution was warmed to 60° C., was extruded into hot air at 220°C. through a spinnerette of 50 orifices of an orifice diameter of 0.15 mm., was wound up at a velocity of 200 m./min. and was then stretched to be three times as long under dry heat at 100°C. to obtain an acrylic synthetic fiber containing microcapsules containing antimony trioxide particles coated with the vinylidene chloride polymer. When this fiber was tested to burn, it showed a favorable flame-retarding property.

On the other hand, in an autoclave, into water were added 10 percent antimony trioxide on the water, 5 percent vinylidene chloride on the water and 2 percent diisopropyl peroxycarbonate as a polymerization initiator on the vinylidene chloride. The mixture was emulsified and dispersed by using a Homomixer and was then polymerized at 40°C. for 4 hours. The vinylidene chloride polymer particles containing the antimony trioxide and obtained by the polymerization were separated, water-washed and then dried. Into a spinning solution formed of 30 parts of an acrylonitrile polymer containing 90 percent acrylonitrile and 10 percent methyl acrylate and 70 parts of dimethyl formamide which was a solvent for said polymer, there was added 3 percent of the microcapsules obtained in the above, containing the antimony trioxide within and having the vinylidene chloride polymer as a wall material on the acrylonitrile polymer. The mixture was emulsified and dispersed by using a Homomixer and was defoamed and then it was attempted but was impossible to spin the mixture. When this spinning solution was investigated with a microscope, the particle diameter of the microcapsule was not less than 1000 $\mu$.

EXAMPLE 5

To 1,000 parts of a spinning solution formed of 12 parts of nylon and 88 parts of 60 percent nitric acid were added 10 parts of a solution consisting of 1 part of ultraviolet ray absorbent phenyl salicylate, 1 part of a polystyrene and 8 parts of chloroform. The mixture was emulsified and dispersed by using a Homomixer and was then warmed to 40°C. under a reduced pressure for 1 hour while being stirred to evaporate the chloroform to obtain a spinning solution containing microcapsules enclosing the ultraviolet ray absorbent within and having the polystyrene as a wall material. The miximum particle diameter of the dispersed microcapsules was 6 $\mu$. This spinning solution was defoamed, was then extruded into an aqueous solution of 5 percent calcium nitrate at 15°C. by using a spinnerette of 8 orifices of an orifice diameter of 0.2 mm., was coagulated and water-washed and was then stretched to be 2 times as long in water at the room temperature and 2.5 times as long in boiling water to obtain a nylon-6 fiber containing microcapsules having the ultraviolet ray absorbent phenyl salicylate as a core substance and having the polystyrene as a wall material.

On the other hand, 10 parts of a solution consisting of 1 part of phenyl salicylate, 1 part of a polystyrene and 8 parts of chloroform were added into 100 parts of water and the mixture was emulsified and dispersed by using a Homomixer and was warmed to 40°C. under a reduced pressure to evaporate the chloroform to obtain an aqueous suspension in which microcapsules enclosing the ultraviolet ray absorbent within were dispersed. The obtained microcapsules were separated from water and were dried. Then 2 parts of them were added to 1,000 parts of a spinning solution formed of 12 parts of nylon-6 and 88 parts of 66 percent nitric acid and the mixture was emulsified and dispersed by using a Homomixer. The particle diameter of the microcapsule in the spinning solution was not less than 500 $\mu$ and it was impossible to spin the solution.

EXAMPLE 6

12 parts of a liquid mixture consisting of 10 parts of tricresyl phosphate which was a flame retardant, 1.5 parts of methyl methacrylate, 0.4 part of polyethyleneglycol dimethacrylate and 0.1 part of azobisisobutylonitrile which was a polymerization initiator for the methyl methacrylate were added into 1,000 parts of a spinning solution of a polyvinyl alcohol formed of 150 parts of a polyvinyl alcohol of an average polymerization degree of 1,500 and 850 parts of water and the mixture was emulsified and dispersed by using a Homomixer and was then left under stirring at 60°C. for 3 hours to make microcapsules containing the tricresyl phosphate within and having the methyl methacrylate series polymer as a wall material in the spinning solution of the polyvinyl alcohol. The obtained spinning solution was defoamed, was then extruded into an aqueous solution of 30 percent sodium sulfate at 40°C. through, a spinnerette of 50 orifices of an orifice diameter of 0.08 mm., was then stretched to be 3 times as long at the normal temperature, was heat-treated in air at 220°C. for 100 seconds, was then treated for 40 minutes in a solution at 70°C. prepared by dissolving 60 g. of formalin, 250 g. of sulfuric acid and 300 g. of sodium sulfate in 1 liter of water so as to be formalized and was washed and then air-dried to obtain a fiber.

On the other hand, 12 parts of a liquid mixture formed of 10 parts of tricresyl phosphate, 1.5 parts of methyl methacrylate, 0.4 part of polyethyleneglycol dimethacrylate and 0.1 part of azobisisobutylonitrile were emulsified and dispersed into 850 parts of water by using a Homomixer and then the mixture was heated at 60°C. for 3 hours to obtain microcapsules enclosing the tricresyl phosphate within and having the methyl methacrylate polymer as a wall material. 150 parts of a polyvinyl alcohol was added to the microcapsules to dissolve them to obtain a spinning solution in which the microcapsules were dispersed. However, the particle diameter of the microcapsules in this spinning solution exceeded 1,000 $\mu$. It was attempted to spin this spinning solution under the same spinning conditions as in the above but the spinnerette orifices were clogged with the microcapsules and the solution could not be spun.

What is claimed is:

1. In a method for producing artificial fibers containing microcapsules of a fiber modifier selected from the group consisting of sanitary processing agents, flame resistant agents, luminous substances, deodorants, softening agents, perfumes, antistatic agents, antioxidants and U.V. absorbers, by extruding a spinning solution containing the microcapsules in a finely dispersed state, a fiber forming polymer selected from the group consisting of polyamides, polyesters, polyvinyl chloride, polyvinyl alcohol, polyacrylonitrile, copolymers of acrylonitrile with one or more other vinyl monomers and cellulose acetate, and a solvent for the polymer, the improvement wherein the spinning solution containing the microcapsules is prepared by finely dispersing in the spinning solution the fiber modifier which is incompatible with the spinning solution and a film-forming substance soluble in the spinning solution or fiber modifier, and forming a film insoluble in the spinning solution on the surface of the dispersed particles of the fiber modifier to form microcapsules enclosing the fiber modifier therein.

2. A method according to claim 1 wherein the microcapsules enclosing the fiber modifier are produced by a microencapsulation method selected from the group consisting of in situ polymerization, interfacial polymerization, phase separation and intra-liquid drying process.

3. A method according to claim 1 wherein 0.5 to 40 percent by weight of said fiber-forming polymer is contained in the spinning solution.

4. A method according to claim 1 wherein the microcapsules are of a size of 0.5 to 30 $\mu$.

5. A method according to claim 1 wherein said fiber-forming polymer is an acrylonitrile polymer or copolymer.

6. A method according to claim 1 wherein said fiber-forming polymer is cellulose acetate.

7. A method according to claim 1 wherein said fiber modifier is finely dispersed in the spinning solution with a particle diameter of not more than 30 $\mu$.

8. A method according to claim 1 wherein said coagulating medium is a liquid.

9. A method according to claim 1 wherein said coagulating medium is a gas.

10. A method according to claim 1 wherein said film-forming substance is a polyvinyl alcohol or melamine-formaldehyde precondensate.

11. A method according to claim 1 wherein the fiber-forming polymer is an acrylonitrile polymer or copolymer and the solvent is selected from the group consisting of dimethyl formamide, dimethyl acetamide, ethylene carbonate, dimethyl sulfoxide, concentrated aqueous solutions of inorganic salts and nitric acid.

12. A method according to claim 1 wherein the spinning solution is composed of an acrylonitrile polymer or copolymer and a concentrated aqueous solution of a thiocyanate.

13. A method according to claim 1 wherein the amount of the fiber modifier in the fibers is not more than 40 percent by weight of the fibers.

14. A method according to claim 1 wherein 2 to 200 percent by weight of the film-forming substance, based on the weight of the fiber modifier, is added to the spinning solution.

* * * * *